(12) United States Patent
Hock et al.

(10) Patent No.: US 10,414,417 B2
(45) Date of Patent: Sep. 17, 2019

(54) WHEELSET MEASUREMENT DEVICE FOR WHEELSETS OF RAIL VEHICLES

(71) Applicant: INDUSTRIE-PARTNER GmBH RADEBEUL-COSWIG, An der Walze (DE)

(72) Inventors: Ralf Hock, Chemnitz (DE); Mario Boehme, Dresden (DE); Joerg Franz, Dresden (DE)

(73) Assignee: INDUSTRIE-PARTNER GMBH RADEBEUL-COSWIG, Coswig (DE)

( * ) Notice: Subject to any disclaimer, the term of this patent is extended or adjusted under 35 U.S.C. 154(b) by 520 days.

(21) Appl. No.: 15/122,463

(22) PCT Filed: Mar. 6, 2015

(86) PCT No.: PCT/EP2015/000511
§ 371 (c)(1),
(2) Date: Aug. 30, 2016

(87) PCT Pub. No.: WO2015/165560
PCT Pub. Date: Nov. 5, 2015

(65) Prior Publication Data
US 2017/0137045 A1   May 18, 2017

(30) Foreign Application Priority Data

Apr. 30, 2014   (DE) .................. 10 2014 006 192

(51) Int. Cl.
| | | |
|---|---|---|
| *G01D 21/00* | (2006.01) |
| *B61K 9/12* | (2006.01) |
| *G01B 11/06* | (2006.01) |
| *G01B 11/24* | (2006.01) |
| *G01M 17/10* | (2006.01) |
| *G01P 3/36* | (2006.01) |
| *B60B 17/00* | (2006.01) |

(52) U.S. Cl.
CPC ............... B61K 9/12 (2013.01); G01B 11/06 (2013.01); G01B 11/24 (2013.01); G01M 17/10 (2013.01); G01P 3/36 (2013.01); *B60B 17/00* (2013.01)

(58) Field of Classification Search
CPC ....................................................... B61K 9/12
USPC ................................................ 33/651, 651.1
See application file for complete search history.

(56) References Cited

U.S. PATENT DOCUMENTS 725,411 A * 4/1903 Compliment et al. .... B23P 6/00 33/193
5,368,260 A * 11/1994 Izbinsky .................. B61K 9/12 246/169 R (Continued)

FOREIGN PATENT DOCUMENTS

| FR | 1559379 B | 1/1969 |
| WO | 2000005120 A | 2/2000 |

*Primary Examiner* — George B Bennett
(74) *Attorney, Agent, or Firm* — Andrew Wilford

(57) ABSTRACT

A wheelset measurement device (1) for the wheelsets (2) of rail vehicles is used to check the wheelsets (2) of rail vehicles for an operationally safe state and for meeting the operating limit measures when built into the rail vehicles. In order to facilitate such checks with comparatively little effort and high reliability, the wheelset measurement device (1) has two separate device subunits (7,8) that can be displaced individually and which each can be pushed laterally against the wheelset (2) and be arranged in the position pushed against the wheelset (2).

16 Claims, 1 Drawing Sheet

(56) References Cited

U.S. PATENT DOCUMENTS

| | | | | |
|---|---|---|---|---|
| 2009/0168078 A1* | 7/2009 | de la Riva | ............... | B61K 9/12 |
| | | | | 356/625 |
| 2013/0313372 A1* | 11/2013 | Gamache | ................. | B61K 9/12 |
| | | | | 246/169 D |
| 2018/0328893 A1* | 11/2018 | Zhang | ...................... | B61K 9/12 |
| 2019/0094181 A1* | 3/2019 | Paulson | ................... | B61K 9/12 |

* cited by examiner

WHEELSET MEASUREMENT DEVICE FOR WHEELSETS OF RAIL VEHICLES

CROSS REFERENCE TO RELATED APPLICATIONS

This application is the US-national stage of PCT application PCT/EP2015/000511 filed 6 Mar. 2015 and claiming the priority of German patent application 102014006192.2 itself filed 30 Apr. 2014.

The invention relates to a wheelset measurement device for wheelsets of rail vehicles by means of which the wheelsets of rail vehicles can be checked for an operationally safe state and for meeting the operating limiting dimensions when incorporated into the rail vehicles.

Below-ground wheelset rotating machines with corresponding measurement technology are known from the prior art. These below-ground wheelset rotating machines are usually built into a pit as fixed installations. Embodiments of such below-ground wheelset rotating machines are also known that are designed as mobile machines and that operate beneath raised rail vehicles. Usually these below-ground wheelset rotating machines are used for reprofiling wheelsets.

Further known from the prior art are measuring devices that are used to measure the wheelset and detect the state of wheelsets and that are configured as devices mounted in the track there. By means of these devices, the data to be recorded can be recorded during travel of the rail vehicle over the relevant track section. These devices require a high investment expenditure, on the one hand in the measurement technology itself and on the other hand in the foundations and separate track connection. These devices are therefore usually only used for high-speed trains.

It is the object of the invention to provide a wheelset measuring device for wheelsets of rail vehicles that can be used in a flexible manner with low expenditure and that leads to reliable measurement results in relation to the safe operational state and in relation to meeting the operating limiting dimensions of wheelsets.

This object is solved according to the invention in that the wheelset measurement device comprises two separate device subunits that can be displaced separately along the ground that can each be pushed laterally against the wheelset and can be located in the position pushed against the wheelset. Accordingly, the wheelset measuring device according to the invention consists of the two device subunits configured as mobile devices that can each be pushed gently against the wheelset from both sides and can be positioned there. The requirement for this is only a ground surface usually provided in flat workshop floors between the track and track pits.

If both device subunits are configured as a wheelset free-lifting device and at least one device subunit is configured as a wheelset rotating and measuring device, the wheelset free-lifting, rotating and measuring device configured or created in such a manner can be used for the recording of wheelset parameters with extremely low time and technical expenditure.

In order to further reduce the time expenditure for the checking of wheelsets it is advantageous if both device subunits of the wheelset free-lifting, rotating and measuring device are configured as a wheelset free-lifting and measuring device and at least one device subunit is configured as a wheelset rotating device.

According to an advantageous embodiment, both device subunits each comprise an integrated chassis by means of which they can be displaced along the ground and brought laterally against the wheelset.

The chassis are advantageously provided as pallet trucks whose distal fork ends comprise supporting paws having a counter-profile, preferably a rail head counter-profile by means of which the device subunits can be positioned in the direction of a wheelset axle.

In order to ensure a uniform flow of supporting forces received by the wheelset free-lifting, rotating and measuring device according to the invention, it is advantageous if the device subunits or the chassis thereof are configured so that during their positioning in relation to the wheelset they can be supported on the ground surface over a large area.

In the case of rails not let in at ground level or spandrel-braced rails, the chassis can be adapted accordingly that can be implemented by means of ground support adapters.

In order to be able to set the wheelset to be checked in a rotational movement in the desired manner, it is advantageous if each device subunit configured as a wheelset rotating device comprises at least one, preferably two wheelset drive rollers that can optionally be inclined synchronously against a running surface of a wheel of the wheelset associated therewith and by means of which the wheelset can be turned. Here the relevant device subunit can be arranged in a centered manner in relation to the wheel subset.

In order to be able to freely lift the wheelset with a comparatively low expenditure, it is advantageous if the device subunits of the wheelset free-lifting, rotating and measuring device each comprise a lifting cylinder with receptacle by means of which the wheelset can be received and lifted freely at its wheelset bearings, wherein the wheelset drive rollers can be tracked in force guidance for maintaining the abutment thereof against the running surface of the wheel of the wheelset associated therewith.

In order to ensure secure receipt of the wheelset bearings on the lifting cylinder and in order to eliminate falsifications of the checking or measurement result, it is expedient if the wheelset drive rollers of each device subunit configured as a wheelset rotating device are held by means of roller supports that for their part can be mounted in a floating manner. As a result, it is possible for the wheelset drive rollers to be able to follow any out-of-roundness of the wheel.

In the case of a device subunit of the wheelset free-lifting, rotating and measuring device according to the invention, not configured as a rotating device, the same type of advantages with regard to the positioning as in the device subunit configured as a wheelset rotating device can be achieved if the device subunit not configured as a wheelset rotating device has non-driven idler rollers that can be brought to abut against the running surface of the wheel of the wheelset associated therewith.

If wheelsets on a rail vehicle with mechanically coupled wheelsets are to be lifted freely and checked, it is expedient if in the wheelset free-lifting, rotating and measurement device according to the invention, the number of device subunits thereof can be adapted to the number of wheels of the mechanically coupled wheelsets. In the case of, for example, three mechanically intercoupled wheelsets, accordingly six device subunits can then be used.

According to an advantageous embodiment of the wheelset free-lifting, rotating and measurement device according to the invention, the device subunits thereof comprise optical and/or mechanical measuring elements by means of which on the wheelset to be checked, a wheel back-to-back distance, a wheel diameter in the running circle plane on both wheel disks, a concentricity deviation in the running circle plane at both wheels, a presence and an extent of flat spots, a wheel profile on both wheels defined by wheel flange height, thickness and steepness, flatness and roll-out on the outer side, a wheel tire/wheel thickness and/or cracks and chipping on the running surface can be measured or detected.

It is advantageous here if a measuring element is configured as a measuring roller mounted on the roller support of a wheelset drive roller that can be brought to abut against the running surface of the wheel of the wheelset.

Furthermore a measuring element is configured as an optical sensor by means of which a rotational speed of the wheel can be measured.

In addition, a measuring element can be configured as an optical sensor disposed on the distal fork end that can measure or detect the wheel profile.

Hereinafter the invention is explained in detail by means of an embodiment with reference to the drawings.

Figure 1:
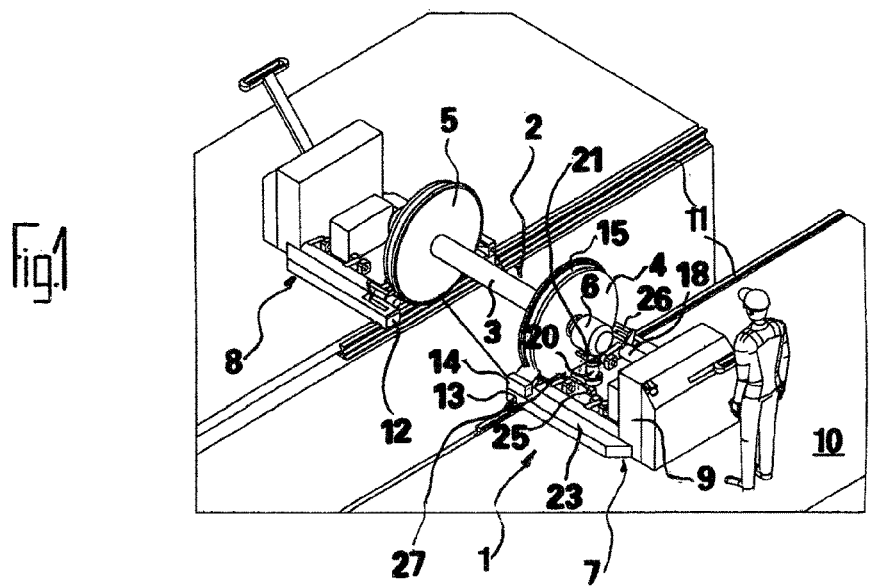
FIG. 1 is a perspective schematic view of an embodiment of a wheelset free-lifting, rotating and measuring device according to the invention on a wheelset where the rail vehicle is not shown for reasons of presentation.
Figure 2:
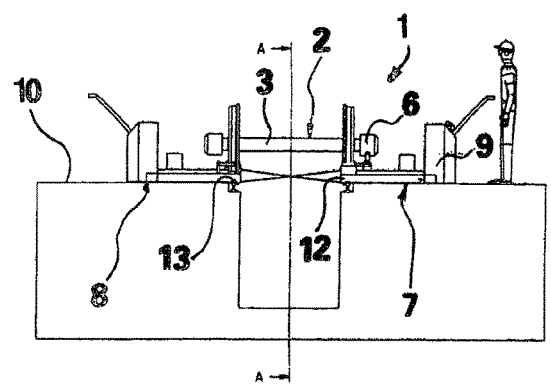
FIG. 2 is a side view of the embodiment shown in FIG. 1 of the wheelset free-lifting, rotating and measuring device according to the invention.
Figure 3:
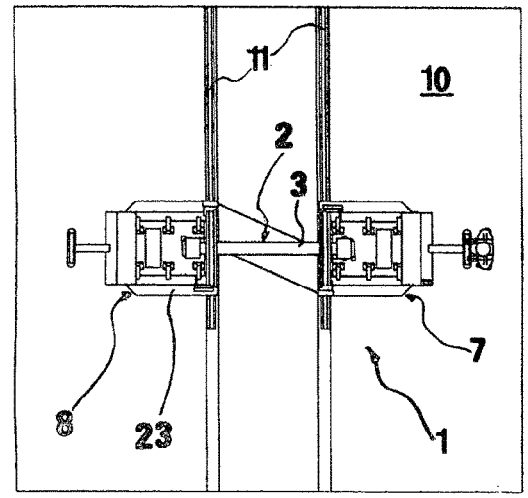
FIG. 3 is a plan view of the embodiment shown in FIGS. 1 and 2 of the wheelset free-lifting, rotating and measuring device according to the invention.
Figure 4:
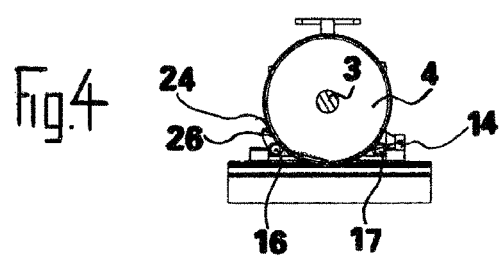
FIG. 4 is the sectional view A-A in FIG. 2.

An embodiment of a wheelset free-lifting, rotating and measuring device 1 according to the invention described hereinafter with reference to FIGS. 1 to 4 is used to check a wheelset 2, which is shown in FIGS. 1 to 3 without the rail vehicle on or in which it is mounted, with regard to its safe operational state and with regard to meeting its operating limiting dimensions.

The wheelset 2 shown in FIGS. 1 to 4 has a wheel axle 3 on both end sections whereof respectively one wheel 4, 5 sits. Each wheel 4, 5 is assigned a wheelset bearing 6 formed by the axle ends of the wheelset axle 3.

The embodiment of the wheelset free-lifting, rotating and measuring device 1 according to the invention shown in FIGS. 1 to 4 has one device subunit 7 or 8 per wheel 4, 5 of the wheelset 2. Each device subunit 7, 8 has a chassis configured as a pallet truck 9. The pallet truck 9 is freely displaceable on a ground surface 10 so that the device subunits 7, 8 can be brought laterally against the two wheels 4, 5 of the wheelset 2 until they occupy the positions shown in FIGS. 1 to 4. Naturally the two device subunits 7, 8 are displaceable separately from one another and separately on the ground surface 10.

In the depicted exemplary embodiment of the wheelset free-lifting, rotating and measuring device 1 according to the invention or in its deployment shown in the figures, rails 11 on which the rail vehicle, not shown in the figures, or the wheelset 2 run are recessed into the floor forming the ground surface 10. The pallet truck 9 forming the chassis of the device subunits 7, 8 has supporting paws 12 at the free ends of the forks thereof, on the underside of which a rail head counter-profile 13 is formed in each case, by means of which the respective device subunit 7, 8 can be positioned in the direction of the wheelset axle 3.

One of the two supporting paws 12 or one of the two distal fork ends of the device subunit 7 or 8 is furthermore provided with an optical sensor 14 that can record or measure the wheel profile and the running surface 15 of the wheel 4, 5 of the wheelset 2.

In order to set the wheelset 2 in rotation for measurement purposes, in the exemplary embodiment shown the device subunit 7 of the depicted embodiment of the wheelset free-lifting, rotating and measuring device 1 according to the invention is fitted with two wheelset drive rollers 16, 17 that for their part are driven by units provided on the device subunit 7. Both wheelset drive rollers 16, 17 are held in roller supports 18. The roller supports 18 for their part are mounted on the device subunit 7 so that they can be displaced into a floating operating mode. Accordingly, it is possible that the wheelset drive rollers 16, 17 can follow an out-of-roundness of the wheel 4.

Each device subunit 7, 8 furthermore has a lifting cylinder 20 that is fitted with a holder 21 in which the wheelset bearing 6 associated with the respective device subunit 7, 8 can be received.

The two wheelset drive rollers 16, 17 can be tracked in force control when the wheelset 2 is raised by means of the lifting cylinder 20 of the device subunit 7 in order to freely lift the wheelset 2.

The device subunit 8 of the embodiment of the wheelset free-lifting, rotating and measuring device 1 according to the invention shown in the figures differs from the previously described device subunit 7 in that no wheelset drive rollers but idler rollers are provided thereon.

In the case of the device subunits 7, 8 shown in FIGS. 1 to 4, the chassis or the pallet truck 9 is configured with a base body 23 so that during positioning of the respective device subunit 7, 8 on the associated wheel 4, 5 of the wheelset 2, this is supported over a large area on the ground surface 10. By this means the forces acting on this during operation of the device subunits 7, 8 can led away into the ground.

The device subunits 7, 8 are fitted with the optical sensor 14 and optical and mechanical measuring units 24, 25 by means of which the wheelset 2 to be checked can be measured and detected with regard to its wheel back-to-back distance, the wheel diameter in the running circle plane of both wheel disks, the concentricity deviation in the running circle plane at both wheels 4, 5, the presence and the extent of flat spots, the wheel profile on both wheels 4, 5—defined by wheel flange height, thickness and steepness, flatness and roll-out on the outer side, the wheel tire/wheel thickness and/or cracks and chipping on the running surface 15 of the wheels 4, 5.

The measuring unit 24 configured as measuring roller 24 is held by means of a holder 26 that sits on the roller support 18 of the wheel drive roller 16 and can be brought to abut against the running surface 15 of the wheel 4.

Furthermore, FIG. 1 shows the measuring unit 25 configured as optical sensor 25 that in cooperation with a wheel-side reflection unit 27 can measure the rotational speed of the wheel 4.

In order to perform the checking of the wheelset 2, the device subunit 7 is brought laterally against the wheel 4 of the wheelset 2 and the device subunit 8 is brought laterally against the wheel 5 of the wheelset 2. There the two device subunits 7, 8 are positioned by placing their supporting paws 12 before and after the wheel 4 or 5 on the rail head with which its rail head counter-profile 13 enters into engagement. The positioning of the device subunits 7, 8 in the direction of the wheelset axle 3 is accomplished by this means.

Simultaneously the base body 23 of the two device subunits 7, 8 is placed over a large area on the ground surface 10 or on the workshop floor in order to lead away the supporting forces that occur during operation of the wheelset free-lifting, rotating and measuring device 1 according to the invention.

The two device subunits 7, 8 are connected by means of suitable electrical connections to an electrical power supply. A compressed air supply is also provided via a workshop network present in the relevant workshop.

Then the two wheelset drive rollers 16, 17 of the device subunit 7 are inclined synchronously to the running surface 15 of the wheel 4 in the outer region with about 20 to 30% of the wheel load whereby the device subunit 7 is positioned in relation to the center of the wheelset 2. By means of the lifting cylinder 20 integrated in the device subunit 7, which is fitted directly on the lifting cylinder with self-locking safety valves, the wheelset 2 is held at the bottom on its wheelset bearing 6 and automatically lifted freely by 3 mm to 10 mm depending on the concentricity error to be expected. The two wheelset drive rollers 16, 17 are thereby tracked in force control.

An operating pendulum not shown in the figures with the required control and display functions is used for triggering the functions.

If the device subunit 8 that functions in the same way with regard to the approaching and lifting process, also notifies via a plugged-in cable connection or optionally via a Bluetooth connection that the wheelset 2 has been lifted freely, the wheelset 2 can be turned by means of the two wheelset drive rollers 16, 17 of the device subunit 7.

In so doing, the roller supports 18 of the two wheelset drive rollers 16, 17 are set in floating operating mode. Accordingly, the wheelset drive rollers 16, 17 follow an out-of-roundness of the wheel 4 so that a secure holding of the wheelset bearings 6 in the holders 21 of the lifting cylinders 20 is ensured and the measurement result is not falsified.

The invention claimed is:

1. A wheelset measurement device for wheelsets of rail vehicles by means of which the wheelsets of rail vehicles can be checked for an operationally safe state and for meeting the operating limiting dimensions when incorporated in the rail vehicles, wherein the wheelset measurement device comprises two separate device subunits that can be displaced separately along the ground, can each be pushed laterally against the wheelset and can be located in the position pushed against the wheelset.

2. The wheelset measurement device according to claim 1, wherein the device subunits are wheelset free-lifting devices and at least one of the device subunits is a wheelset rotating and measuring device.

3. The wheelset free-lifting, rotating and measurement device for wheelsets of rail vehicles according to claim 2, wherein both device subunits are wheelset free-lifting and measurement devices and at least one device subunit is a wheelset rotating device.

4. The wheelset free-lifting, rotating and measurement device for wheelsets of rail vehicles according to claim 2, wherein each device subunits comprises an integrated chassis by means of which it can be displaced along the ground and brought laterally against the wheelset.

5. The wheelset free-lifting, rotating and measurement device for wheelsets of rail vehicles according to claim 4, the chassis of the device subunits are pallet trucks whose distal fork ends comprise supporting paws having a rail head counter-profile by means of which the device subunits can be positioned in the direction of a wheelset axle.

6. The wheelset free-lifting, rotating and measurement device for wheelsets of rail vehicles according to claim 4, wherein the device subunits or the chassis thereof are configured so that during their positioning in relation to the wheelset they can be supported on the ground surface over a large area.

7. The wheelset free-lifting, rotating and measurement device for wheelsets of rail vehicles according to claim 4, wherein the device subunits or the chassis thereof have ground support adapters.

8. The wheelset free-lifting, rotating and measurement device for wheelsets of rail vehicles according to claim 2, wherein each device subunit configured as a wheelset rotating device comprises two wheelset drive rollers that can optionally be inclined synchronously against a running surface of a wheel of the wheelset associated therewith and by means of which the wheelset can be turned.

9. The wheelset free-lifting, rotating and measurement device for wheelsets of rail vehicles according to claim 8, wherein the device subunits each comprise a lifting cylinder with receptacle by means of which the wheelset can be received and lifted freely at its wheelset bearings, the wheelset drive rollers can be tracked in force control for maintaining the abutment thereof against the running surface of the wheel of the wheelset associated therewith.

10. The wheelset free-lifting, rotating and measurement device for wheelsets of rail vehicles according to claim 8, wherein the wheelset drive rollers of each device subunit configured as a wheelset rotating device are held by roller supports that are mounted in a floating manner.

11. The wheelset free-lifting, rotating and measurement device for wheelsets of rail vehicles according to claim 2, wherein the device subunit not configured as a wheelset rotating device has non-driven idler rollers which can be brought to abut against the running surface of the wheel of the wheelset associated therewith.

12. The wheelset free-lifting, rotating and measurement device for wheelsets of rail vehicles according to claim 2, wherein the number of device subunits can be adapted to the number of wheels of mechanically coupled wheelsets.

13. The wheelset free-lifting, rotating and measurement device for wheelsets of rail vehicles according to claim 2, wherein the device subunits configured as wheelset measurement device comprise optical and/or mechanical measuring elements by means of which on the wheelset to be checked with respect to a wheel back-to-back distance, a wheel diameter in the running circle plane on both wheel disks, a concentricity deviation in the running circle plane at both wheels, a presence and an extent of flat spots, a wheel profile on both wheels defined by wheel flange height, thickness and steepness, flatness and roll-out on the outer side, a wheel tire/wheel thickness and/or cracks and chipping on the running surface.

14. The wheelset free-lifting, rotating and measurement device for wheelsets of rail vehicles according to claim 13, in which a measuring element is a measuring roller mounted on the roller support of a wheelset drive roller that can be brought to abut against the running surface of the wheel of the wheelset.

15. The wheelset free-lifting, rotating and measurement device for wheelsets of rail vehicles according to claim 13, wherein a measuring element is an optical sensor by means of which a rotational speed of the wheel can be measured.

16. The wheelset free-lifting, rotating and measurement device for wheelsets of rail vehicles according to claim 13, wherein a measuring element is an optical sensor disposed on the distal fork end that can detect the wheel profile.

* * * * *